United States Patent
Eisenberger

(10) Patent No.: US 9,532,629 B1
(45) Date of Patent: *Jan. 3, 2017

(54) CLASP HELD BY OPPOSING MAGNETIC FORCES

(71) Applicant: Harald Eisenberger, New York, NY (US)

(72) Inventor: Harald Eisenberger, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/910,272

(22) Filed: Jun. 5, 2013

Related U.S. Application Data

(62) Division of application No. 12/887,614, filed on Sep. 22, 2010, now Pat. No. 8,474,108.

(51) Int. Cl.
*A44C 5/20* (2006.01)
*H01F 7/00* (2006.01)
*A44B 11/25* (2006.01)
*F16B 1/00* (2006.01)

(52) U.S. Cl.
CPC ............. *A44C 5/2071* (2013.01); *F16B 1/00* (2013.01); *F16B 2001/0035* (2013.01); *Y10T 24/32* (2015.01)

(58) Field of Classification Search
CPC ... A44C 5/2071; F16B 1/00; F16B 2001/0035
See application file for complete search history.

(56) References Cited

U.S. PATENT DOCUMENTS

| | | | | |
|---|---|---|---|---|
| 3,027,617 A | * | 4/1962 | Gray | A44B 11/258 24/303 |
| 3,112,638 A | * | 12/1963 | Bey | A44B 15/002 24/303 |
| 3,192,747 A | * | 7/1965 | Stupell | A44B 15/002 2/338 |
| 4,622,726 A | * | 11/1986 | Nakamura | A44C 5/2057 24/303 |
| 4,982,581 A | * | 1/1991 | Furuyama | A44C 17/0216 24/303 |
| 5,367,891 A | * | 11/1994 | Furuyama | A44C 5/2057 24/303 |
| 5,664,298 A | * | 9/1997 | Nessar-Ivanovic | A44C 5/2071 24/303 |
| 6,981,391 B2 | * | 1/2006 | Suzuki | A44C 5/2076 24/303 |

(Continued)

*Primary Examiner* — Robert J Sandy
*Assistant Examiner* — Louis Mercado
(74) *Attorney, Agent, or Firm* — Michael J. Feigin, Esq.; Feigin & Fridman

(57) ABSTRACT

A connector with two magnets with like poles facing towards each other. A first magnet of the two magnets is fixedly attached to a support base and female receptacle situated above the same pole of the first magnet. The second magnet is fixedly attached to a male flange adapted for passage through the female receptacle. The male flange and second magnet are further fixedly attached to a length of material which is longer than the female receptacle, such that the male flange remains within the female receptacle in an assembled condition due to a magnetic force pushing each magnet away from the other. Another embodiment includes a method of use, including lining up the male flange into the female receptacle for locking and pushing down and slightly transversely on the male flange to unlock.

13 Claims, 15 Drawing Sheets

(56) References Cited

U.S. PATENT DOCUMENTS

| | | | |
|---|---|---|---|
| 7,523,527 B2* | 4/2009 | Garber | A44C 5/2061 24/303 |
| 2008/0271296 A1* | 11/2008 | Jepsen | A44C 5/185 24/265 EC |
| 2011/0289737 A1* | 12/2011 | Ninomiya | H01F 7/0263 24/303 |

* cited by examiner

CLASP HELD BY OPPOSING MAGNETIC FORCES

FIELD OF THE DISCLOSED TECHNOLOGY

The disclosed technology relates generally to clasps, and more specifically, to magnetic clasps.

BACKGROUND OF THE DISCLOSED TECHNOLOGY

Clasps and buckles are well known in the art. These articles generally function by affixing or joining two ends together by way of a fastener. The two ends may be two ends of the same device, such as a length of fabric or rope, or may be two ends of two different devices. With a magnetic clasp or fastener, such as, for example, with a doorstop or computer security device, magnets or electromagnets of opposite polarity are attracted to each other. The above are the most commonly known clasps and buckles in the art.

SUMMARY OF THE DISCLOSED TECHNOLOGY

It is an object of the disclosed technology to provide a buckle/clasp/connector (hereinafter, "connector") which is held in place due to repulsive magnetic forces.

It is a further object of the disclosed technology to provide a connector which can be attached/detached with a single hand.

It is a further object of the disclosed technology to provide a simple to manufacture and procure connector which is also robust.

It is a further object of the disclosed technology to provide a connector for use with jewelry, clothing, seat belts, handbags, school bags, toys, and the like.

It is a further object of the disclosed technology to provide connectors of a variety of shapes and sizes.

An embodiment of the disclosed technology is a connector held in place by repulsive magnetic forces. The connector has two parts—one female and one male. The female connector has a base, a top receptacle, and an opening extending into a space between the base and the top receptacle. The male connector is adapted to fit through this space (its width and depth are less than that of the aforementioned space). The male connector has a top button adapted to fit into the top receptacle (its length and width are less than that of the receptacle, generally such that, when viewed from the top of the receptacle, the receptacle appears to be filled with the button, generally being defined as at least 95% filled). The male connector also has, or is attached to, elongated material adapted to abut the top receptacle when the button is in the receptacle. That is, the male connector enters the space between the base and the top receptacle, and the button is pushed up into the top receptacle, the length of material connected to the button holding the button in place.

The button, when aligned properly with the top receptacle, is thrust into the receptacle by way of repulsive magnetic forces. That is, a first magnet fixedly attached to the male connector has two polarities, north and south. One of these polarities faces away from the top side of the male connector, and the other, towards it. A second magnet is fixedly attached to the base of the female connector, wherein the same polarity as described above, which faced away from the top side of the male connector, in this case faces towards the top receptacle of the female connector. For the sake of convenience of explanation, when viewing the top of the receptacle as "up" and the base as "down" and the button/male connector being engaged with the female connector, the first polarity of the male member (e.g., north) faces "down" and the first polarity of the female member (e.g., north, again) faces "up," such that the magnets repel one another. That is, opposite polarities of the magnets face each other in the assembled condition, causing the button of the male member to be thrust into the female member. This holds the male member and female member together.

The top button of the male member may actually be a plurality of top buttons, in embodiments of the disclosed technology, the buttons attached to, and spaced apart on, said elongated material, each of which is engageable with said top receptacle.

The top receptacle of the female connector has, in embodiments of the disclosed technology, a portal therein. For purposes of this disclosure, the top side of the top receptacle is a side opposite the base of the female connector. In an embodiment of the disclosed technology, the portal in the top side is of rectangular shape and is the button. In another embodiment, the portal and button are heart-shaped.

A method of using the above-described connector is also disclosed. The method of use proceeds by pushing the button of the male connector through the space of the female connector (the space between the top receptacle and base) until the first and the second magnet push the button through the receptacle, causing the male and female connectors to be engaged. In a next step, the button is pushed towards the base, that is, the magnets are pushed together, causing the button to exit the receptacle.

In another embodiment of the disclosed technology, a connector has two repelling magnets held in place relative to one another. A first magnet is fixedly attached to a base and a second magnet is fixedly attached to a male member. The male member comprises a vertical member extending substantially perpendicular (substantially defined as either within an acceptable tolerance level known to one of ordinary skill in the art or within a tolerance level of 5 degrees from truly perpendicular) to a length of material making up the male member. At least part of the vertical member is adapted to extend through a receptacle, the receptacle being fixedly attached to the base. The vertical member, in embodiments, extends perpendicular to the length of material.

In certain embodiments, such as when used with jewelry, a first portion of the length of material is fixedly attached to the female member and a second portion of the length of material, such as at the opposite side of the length of material, has the vertical member used for engagement with the female member. In embodiments, when the vertical member is depressed, the repelling magnets cause the male member to move transverse to the receptacle. The vertical member may be heart-shaped or rectangular, amongst other shapes.

A connector kit is also disclosed. The kit has a female connector and length of material, the length of material having top and bottom sides and a male connector at one end. The female connector has a base with top and bottom sides, the top side having a portal adapted for receiving a male connector and first magnet fixedly attached to the base. A first polarity (that is, north or south) of the magnet faces towards the top side of the female connector. The male connector extends above a horizontal plane of the top side of the aforementioned length of material and a second magnet is fixedly attached thereto. The first polarity (that is, north or south, and being the same as the polarity described above with respect to the first magnet) of this second magnet faces away from the top side of the male connector. As such, the portals of the female connector and the male connector are engaged by passage of the second magnet over the first magnet. By doing so, the magnets repel and push the male connector into the receptacle of the female connector, where the former is held in place by repulsive magnetic forces. In an assembled condition, the first and second magnets are aligned and the magnetic fields oppose each other.

A shape of the portal of the female connector may be selected from the group consisting of heart, square, rectangular, triangular, diamond, and circular. The length of material may be fixedly attached to the female connector. The male member may comprise a plurality of male connectors, spaced apart and fixedly attached to the length of material.

In embodiments of the disclosed technology, upon depressing the male connector, the male and the female connectors disengage due to repulsive magnetic forces. In a method of using the connector kit, the method proceeds with a step of pushing the male connector into a space between walls of the portal and the base, until the male connector is magnetically repulsed into the portal and at least a portion of the length of material abuts a wall of the portal.

Further details are set forth in the detailed description below.

DETAILED DESCRIPTION OF EMBODIMENTS OF THE DISCLOSED TECHNOLOGY

Embodiments of the disclosed technology include a connector comprising two magnets with like poles facing each other. A first magnet of the two magnets is fixedly attached to a support base and female receptacle situated above the like pole of the first magnet. The second magnet is fixedly attached to a male flange adapted for passage through the female receptacle. The male flange and second magnet are further fixedly attached to a length of material which is longer than the female receptacle, such that the male flange remains within the female receptacle in an assembled condition due to magnetic force pushing each magnet away from the other.

Other embodiments include the use of a series of male flanges fixedly attached to the length of material, and variously-shaped, structured, and strengthed parts. Still another embodiment includes a method of use, including lining up the male flange into the female receptacle for locking and pushing down slightly transversely on the male flange to unlock.

Embodiments of the disclosed technology will become clearer in light of the following description of the figures.

Figure 1:
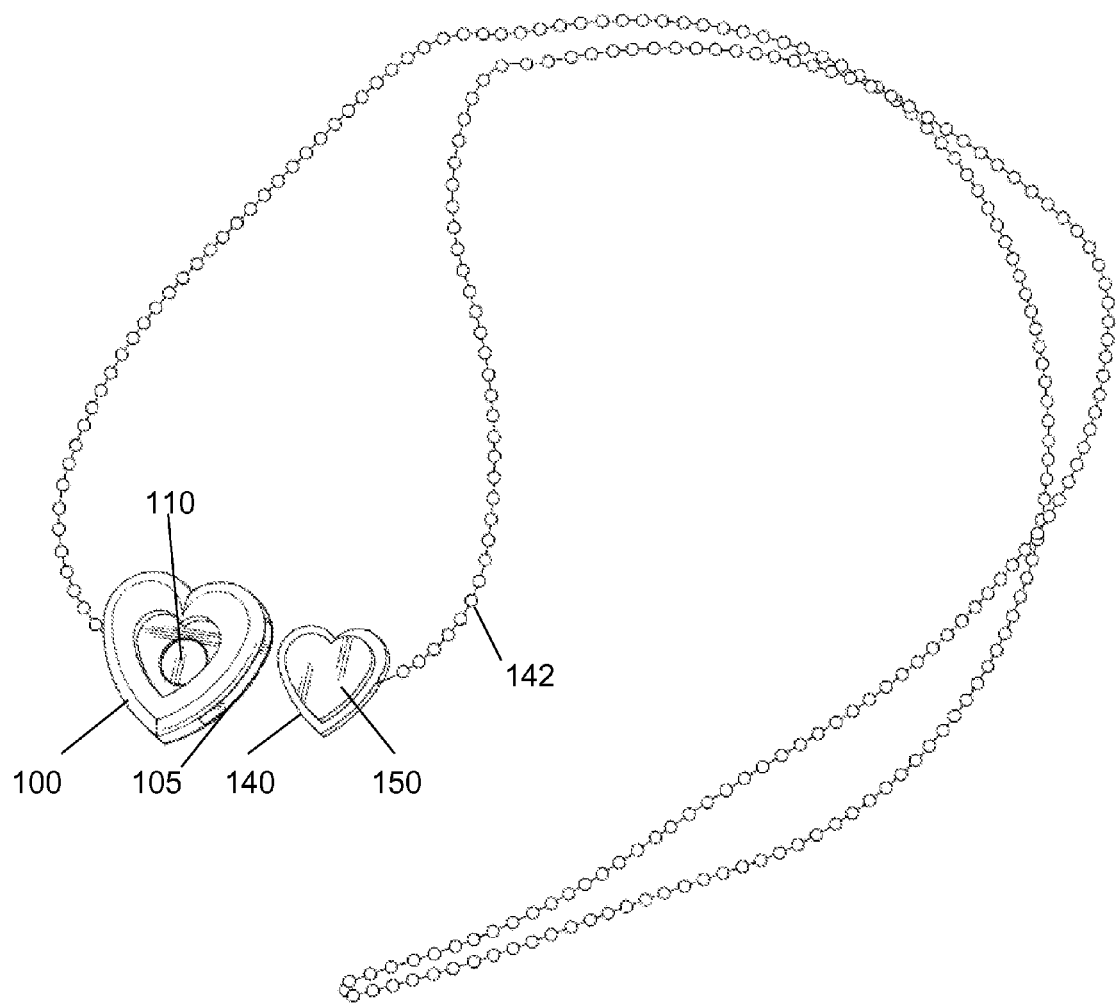
FIG. 1 shows a necklace with clasp as an embodiment of the disclosed technology in a disconnected state.

FIG. 1 shows a necklace with clasp of embodiments of the disclosed technology in a disconnected state. In this particular embodiment, a pendant 100 (female connector) of the necklace is heart-shaped, as are the male connector 140 and button 150, the button 150 rising above the horizontal plane of the chain (elongated horizontal member) 142. In this case, the chain further connects, at an opposite end, to the heart-shaped pendant 100, such that when the button is inserted through the side channel/portal (opening between a top of the female connector and base) 105, the necklace forms a loop. Also visible in this figure is magnet 110, which serves to oppose a magnet on the underside of the male connector 140 (not shown).

Figure 2:
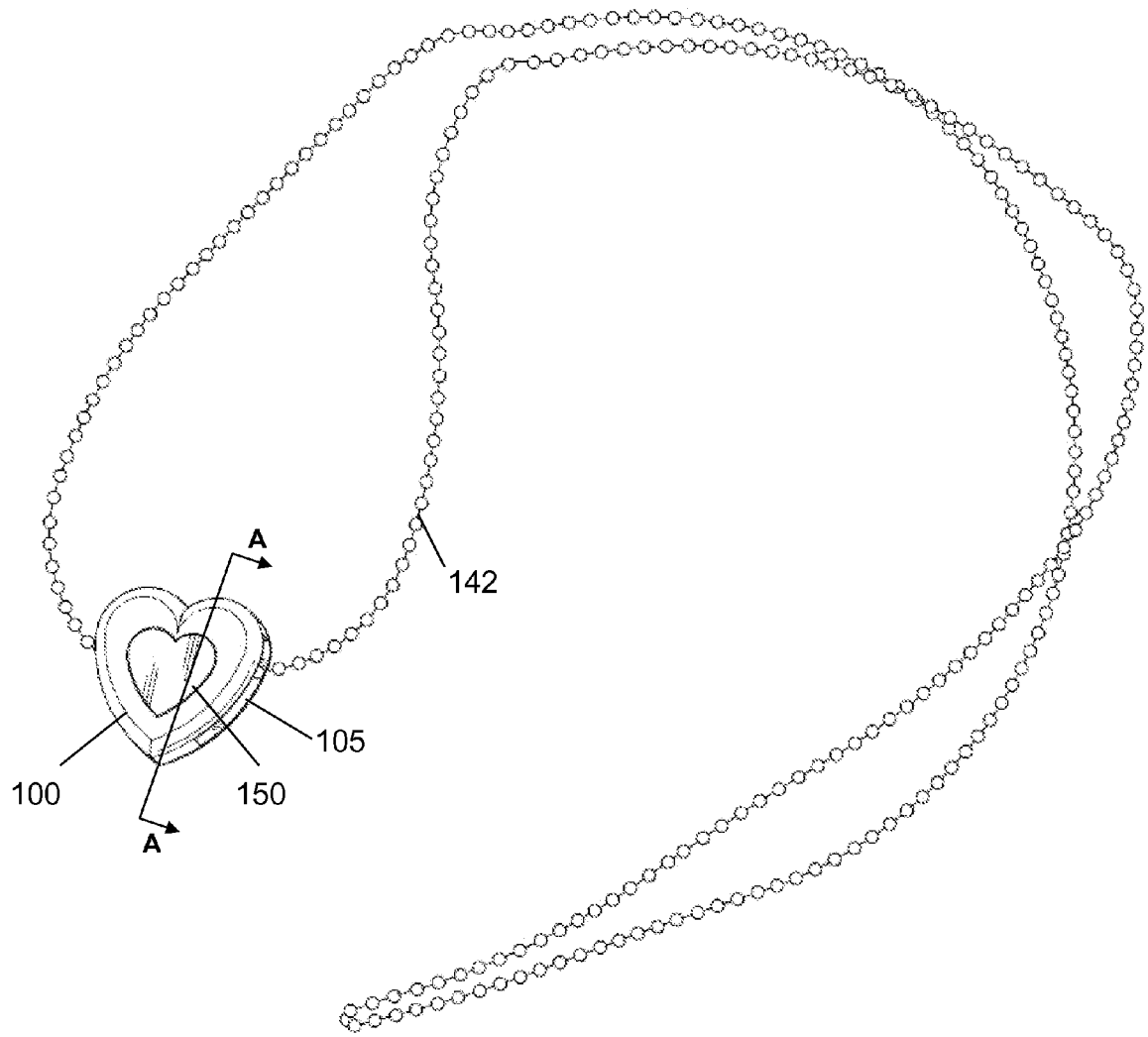
FIG. 2 shows the necklace of FIG. 1 in a connected state.

FIG. 2 shows the necklace of FIG. 1 in a connected state. Note that the chain (elongated horizontal member) 142 passes between the top of the female connector 100 and its base (the bottom of the female member, or the side opposite the side with the portal for passage of the button 150). The button 150 of the male member, which is fixedly attached to the chain 142, enters into the portal formed by walls of the top of the female connector. As will be shown more clearly in further figures, a magnet within the male connector and a magnet within the base of the female connector cause the button 150 to oppose the base of the female connector and remain securely in the portal of the top portion of the female connector. The chain 142, in this embodiment, is connected to both the female and male connectors, such that a complete loop is formed.

Figure 3:
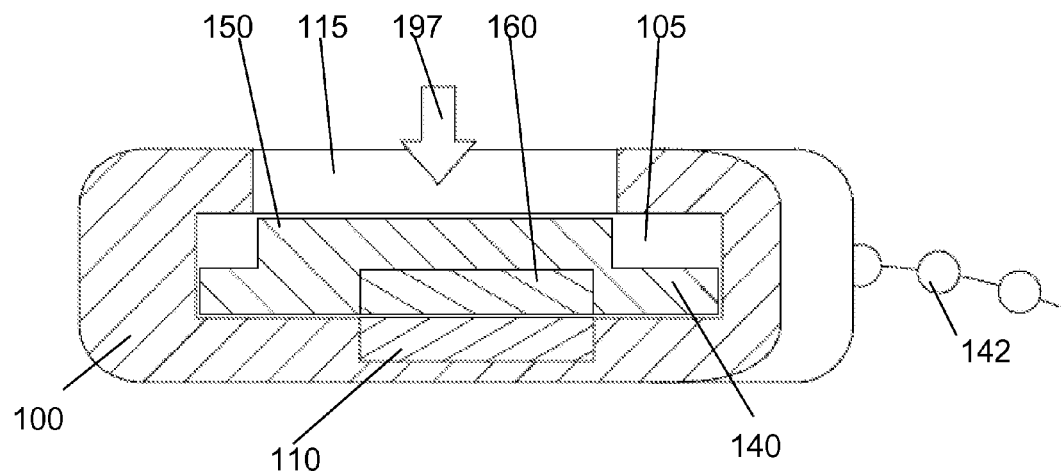
FIG. 3 shows a cross section of the necklace of FIG. 2, with button depressed, along section line A-A.

FIG. 3 shows a cross-section of the necklace of FIG. 2, with button depressed, along section line A-A. The male connector 140 is adapted for passage through the side channel 105 (here, the generally rectangular space between the female connector 100, excluding the portal 115 of this cross-section). The male connector button 150 in this embodiment can be visualized in two parts. The narrower top half (relative to the orientation of the figure and in this disclosure defined as the "top") is the button which is adapted to fit within the portal or top receptacle 115 of the female connector, while the elongated or wider portion of the male connector is adapted to abut the top receptacle when the button is lodged in the receptacle of the female connector. The elongate horizontal material of the male connector 140, in this embodiment, is the lower lip of the male connector (see FIG. 1; the wider heart beneath the top button 150/heart of the male connector). Elongate horizontal, for purposes of this disclosure, is defined as extending longitudinally further than the portal/top receptacle of the female connector when the button 150 is lodged therein. In this embodiment, it is a wider brim formed integral with the top button or male connector, though in other embodiments, a length of fabric, chain, cable, or the like is employed, as disclosed in more detail below.

Figure 4:
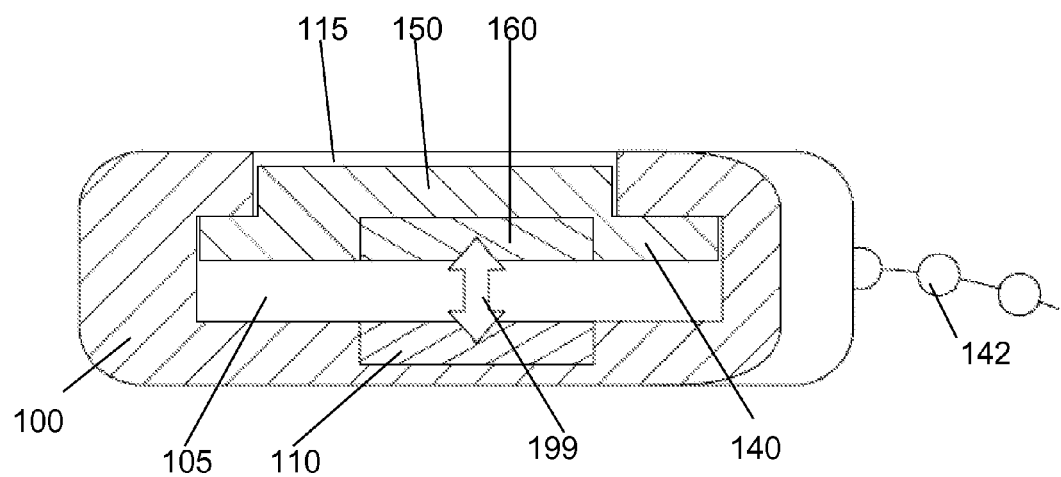
FIG. 4 shows a cross-section of the necklace of FIG. 2, in a fully connected configuration, along section line A-A.

FIG. 4 shows a cross section of the necklace of FIG. 2, in a fully connected configuration, along section line A-A. Referring also still to FIG. 3, note that when inserting the male connector into the female connector, at first the device will be in the state shown in FIG. 3, where the magnet 160 of the male member and magnet 110 of base of the female member are near each other (relative to the distance of FIG. 4). While depth isn't shown in FIG. 3 or 4, once the male connector is pushed such that the button 150 of the male connector 140 lines up with the portal or top receptacle 115 of the female connector, the repulsive forces 199 created by the magnets push the magnets 110 and 160 apart. That is, relative to the base (bottom) of the female connector 100, the male connector is pushed upwards, such that the button (top portion adapted to fit within the receptacle/portal 115) of the male connector 140 becomes lodged between top walls of the female member and within the female receptacle/portal as shown in FIG. 4.

When one wishes to disconnect the male connector 150 from the female connector 100, this may be accomplished by applying force 197 in the direction shown in FIG. 3. That is, force is applied downwards on the button 150 of the male connector 140, or, in the direction of the base, or, such that the magnets 110 and 160 are pushed together. By doing so, the button of the male connector 140 is dislodged from the top portal/receptacle 115 of the female connector, and the repulsive forces 119 of the magnets cause the male member 140 to be pushed out of the opening within the side walls 105 (see FIGS. 1 and 2). In this manner, the male and female members may be disengaged.

The necklace shown in the above figures is but one of many embodiments of the present technology. When used for jewelry, the jewelry item may be any item which latches to itself (the two ends of which latch one to the other) or another portion of jewelry, such as a necklace, bracelet, watch, earring or the like. The size of the connectors is varied accordingly, and the elongate horizontal member (such as a chain or band) may be rigid or flexible. So too, many different materials may be used, including any magnetic material for the magnets, and any metal or alloy, gem, stone, leather, or the like for the connectors and/or horizontal elongate member. For example, FIG. 5 shows a bracelet, as described below.

Figure 5:
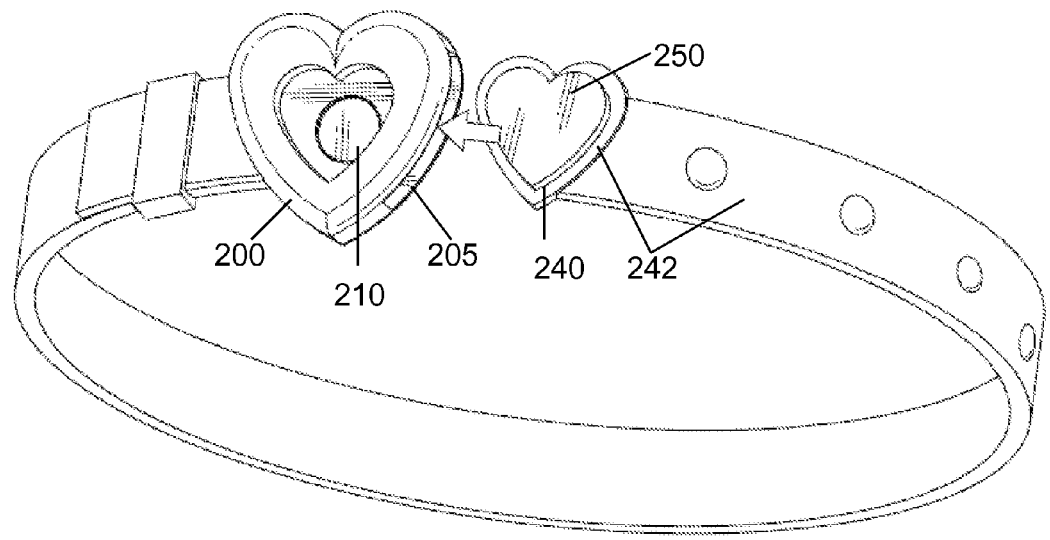
FIG. 5 shows a bracelet with clasp of embodiments of the disclosed technology in a disconnected state.
Figure 6:
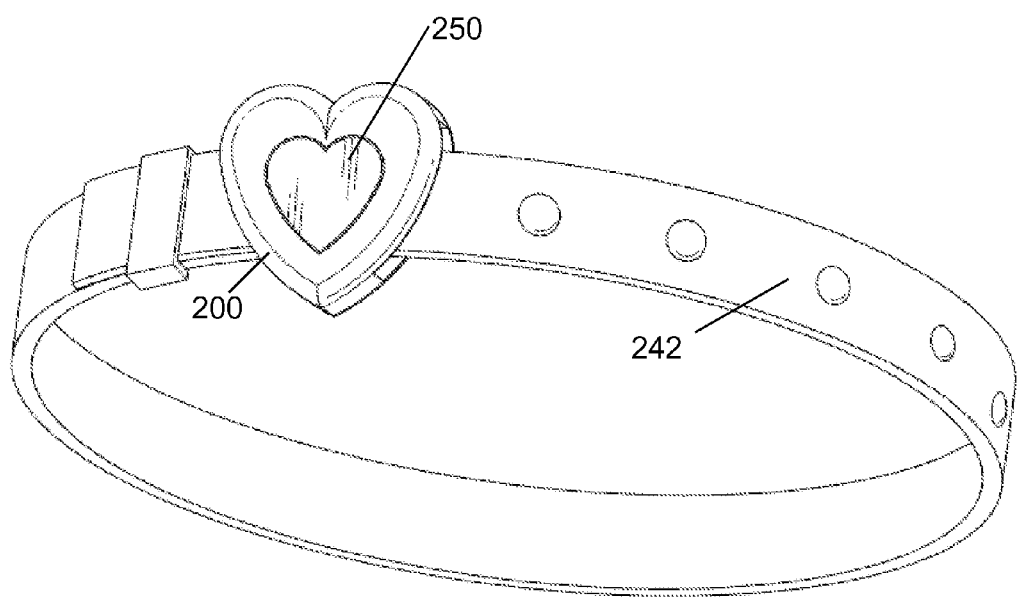
FIG. 6 shows the necklace of FIG. 5 in a connected state.

FIG. 5 shows a bracelet with clasp of embodiments of the disclosed technology in a disconnected state. FIG. 6 shows the necklace of FIG. 5 in a connected state. Where applicable, elements of FIGS. 1 through 4 have been incremented by 100 when shown and described with reference to the embodiment of FIGS. 5 and 6. The shape of the button 250 is again a heart (as is the receptacle of the female connector 200 shown around the button in FIG. 6), but it should be understood that any shape may be employed, including, but not limited to, a regular polygon, diamond, triangle, rectangle, square, circle, or oval. Here, the elongate horizontal member (the portion of, or connected to, the male connector 240 which extends past the horizontal plane of the button) is designated as 242. By way of repulsive magnetic forces, in an assembled condition, the elongate horizontal member 242 is pushed into the top walls of the female receptacle, and the button 250 is pushed into the receptacle area itself, at least so far as side walls of the top of the receptacle prevent lateral or transverse movement of the male connector, holding it in place.

The elongate horizontal member is the portion which abuts or extends past the top receptacle/portal of the female connector (such as connector 200) when the button (such as button 250) of the male connector is engaged therewith. Likewise, the button is the portion of the male connector which breaks the generally horizontal plane of the male connector to extend above the proximal horizontal plane of the elongate horizontal member and is engageable (enters into a portal space between the top walls of the female connector) with the female connector. Here, the elongate horizontal member 242 is either or both of the heart-shaped lip extending past the button 250 and/or the proximal portion of the band which enters into the side recess 205 of the female member. In an engaged configuration, that is, referring to FIG. 6, for example, at least a part of the elongate horizontal member 242 abuts the inner top side of the female connector. The top side of the female connector is defined as the side with the portal/receptacle of the female connector, with the bottom side or base of the female connector being on the opposite side and comprising a magnet (or polarized magnetizable material). The side recess or receptacle is an opening or space between the top and bottom sides of the female connector.

Figure 7:
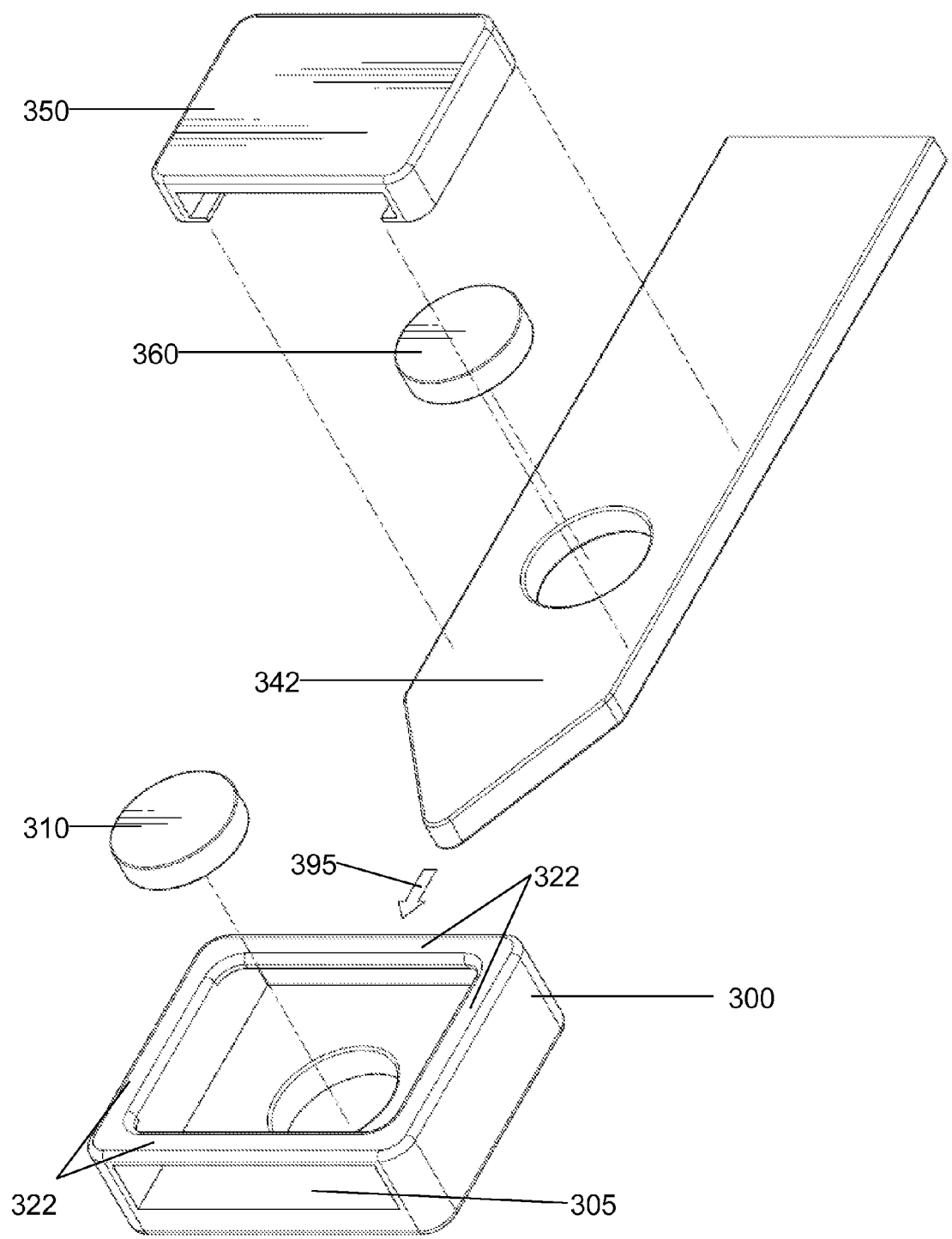
FIG. 7 shows a blown-apart view of a connector of embodiments of the disclosed technology.

FIG. 7 shows a blown-apart view of a connector of embodiments of the disclosed technology. Elements of the prior figures have been incremented by a multiple of 100. The male connector 340 comprises a top button (or button) 350 with magnet 360 and elongated horizontal member 342. The female connector 300 comprises a magnet 310 and side channel or recess 305. The female connector has a top side 322 forming a lip around a top portal or receptacle. The top side is the side with the receptacle adapted for passage therethrough of a button and is opposite the base, the base having a magnet affixed thereto. The shape of the top receptacle can be substantially any shape, so long as a user is able to access a portion of the button, which can likewise be any shape, in order that the button be pushed down when disengaging the members.

Referring now to the male connector 340, an elongated horizontal material (as disclosed in more detail with reference to the prior figures) is fixedly attached to a magnet 360 and a button 350. The button 350 is any flange which rises vertically from a plane of a generally flat (meaning, as is accepted as flat in the art of belts and the like or to the casual observer) elongated horizontal material 342. The button rises perpendicularly or substantially perpendicularly (defined as within a 5 degree tolerance level) to the elongated plane of the horizontal member 342.

As shown in FIG. 7, the female connector 300 has two side channels 305, the labeled channel near the bottom of the figure and an unlabeled channel near the top of the female connector 300. The elongated horizontal material 342 passes through at least one recess in the direction shown by the arrow 395. Once passed into the female receptacle, the magnets 310 and 360 repulse each other, pushing the button 350 into the top receptacle/between the top walls 322 of the female connector 300. The upward/vertical motion of the male connector is stopped by the abutment of the elongated horizontal material 342 against the top walls 322 of the female connector 300, and transverse/horizontal movement is prevented due to the button's placement within the top receptacle and the opposing magnetic forces keeping the button in place.

Figure 8:
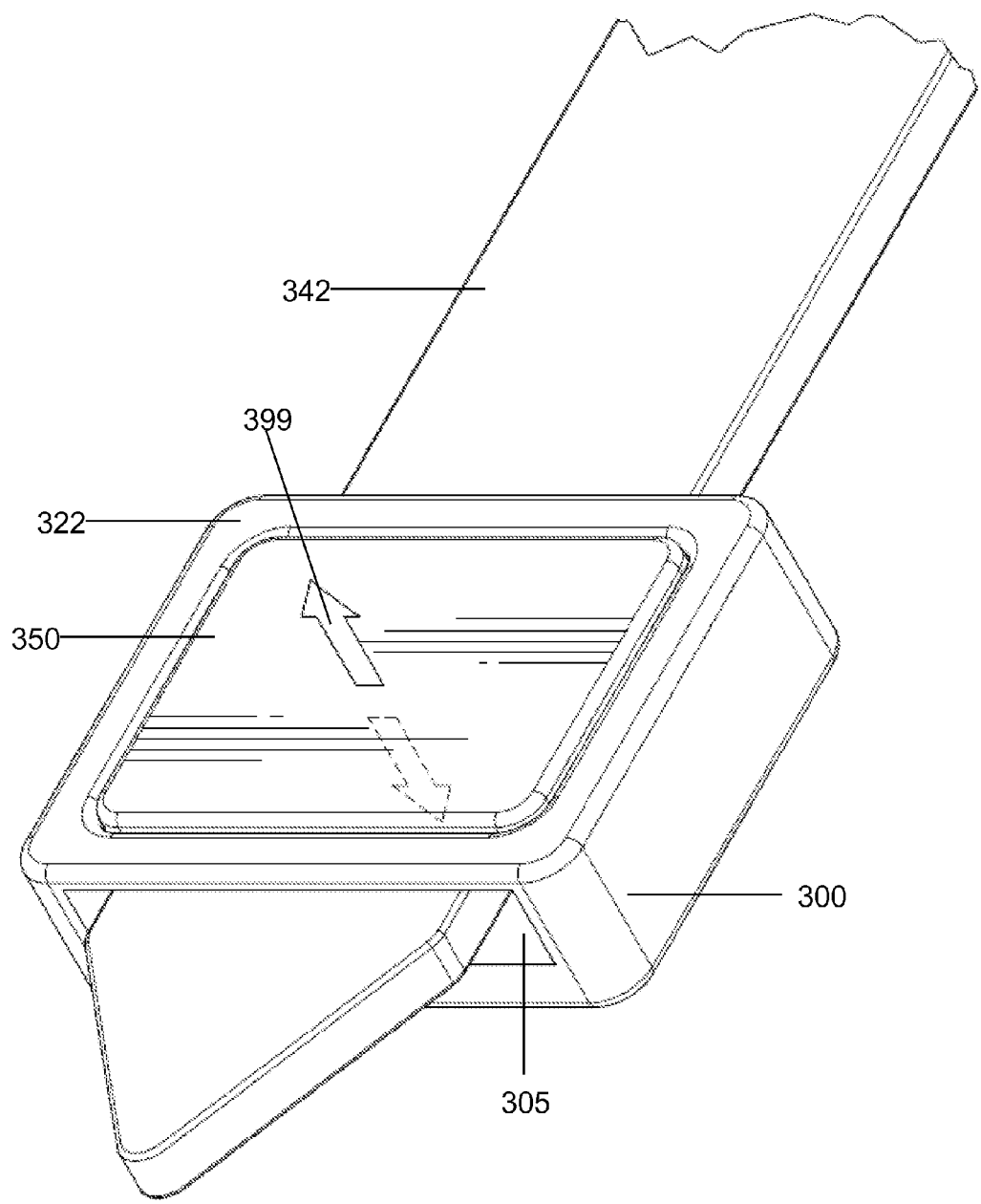
FIG. 8 shows a perspective view of male and female connectors in a connected state, in an embodiment of the disclosed technology.

FIG. 8 shows a perspective view of a male and female connector in a connected state, in embodiments of the disclosed technology. In the connected state, oppositional magnetic forces 399 keep the button 350 lodged within the receptacle formed between top walls 322 of the female receptacle 300. The elongated horizontal member 342 extends through at least one side recess 305, the side recess being a portal between the top walls 322 and base of the female receptacle 300. The male connector is thus held in place by way of the vertically extending button into the receptacle, preventing transverse (horizontal) movement of the male connector in and out of the female connector.

Figure 9:
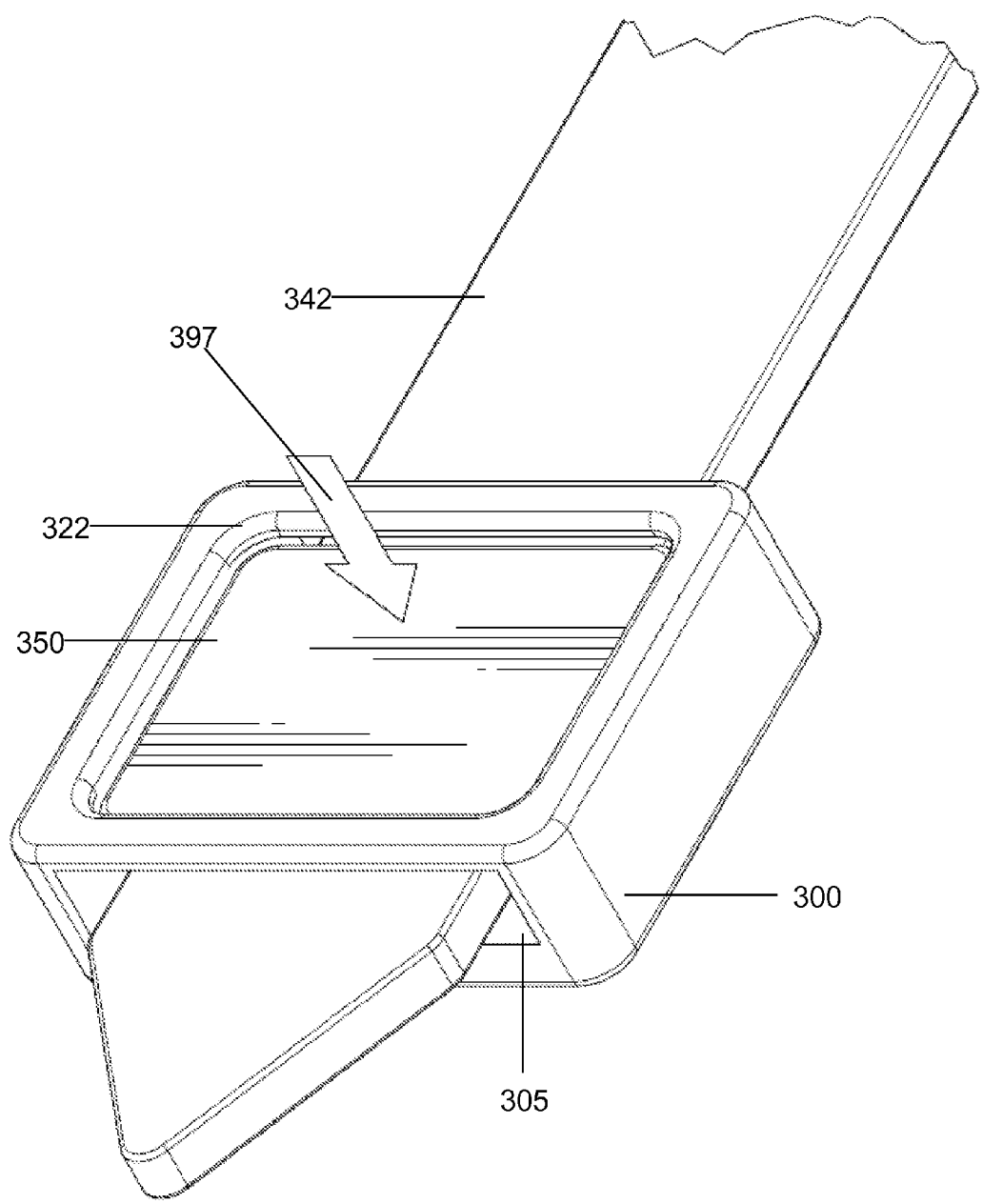
FIG. 9 shows a perspective view of male and female connectors as the connectors are being disengaged.

FIG. 9 shows a perspective view of a male and a female connector as the connectors are being disengaged. In this configuration, a user pushes down on the button 350 in the direction of arrow 397. This causes the magnet of the male connector and the magnet of the female connector to be forced together, against the opposing magnetic forces which, in a resting state, push the button and male connector away from the base of the female connector. When the force 397 is provided, the opposing magnetic force continues to act between the magnets and forces the button 350 and male connector out of one of the side recesses 305 of the female connector. Depending on a slight transverse/horizontal variation to the downward force 397, which may be activated consciously or unconsciously by a user, the direction of least resistance will cause the male connector to exit out of one or the other of the recesses 305. One of the side recesses is shown, the other recess being on the opposite side.

Figure 10:
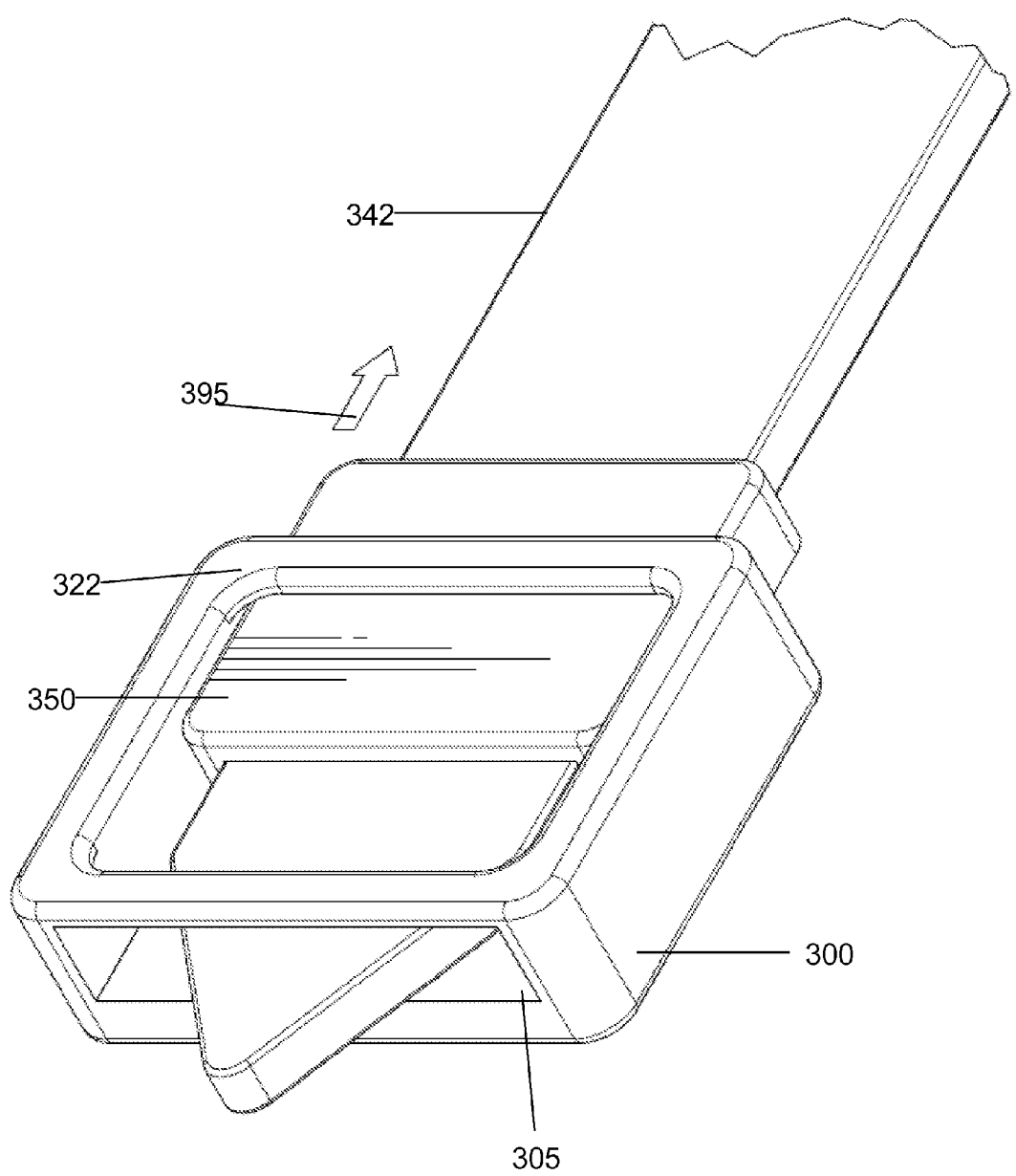
FIG. 10 shows a perspective view of male and female connectors as the connectors are being further disengaged.

FIG. 10 shows a perspective view of a male and a female connector as the connectors are being further disengaged. Note in this figure that the button 350 and elongated horizontal member 342 have partially exited the female receptacle 300. Force 395 is generated by the repelling of the magnets, the first magnet being underneath the button 350 and the second being in the base of the female connector 300. In real life tests of this device, upon button 350 being depressed (as shown in FIG. 9), it moves in such a manner that more than half of it is outside of the female connector 300. At this point, the sides of the magnets attract each other and a second resting position is reached. Depending on the size and strength of the magnets, this second resting position is calibrated in embodiments of the disclosed technology, such that, upon force 397 being provided (see FIG. 9), the button may completely exit the female receptacle 300, may exit more than half, or may exit less than half. Depending on the embodiment, different exit configurations are desired. For example, when used in conjunction with a seat belt or handbag, it may be desired that, upon the button being pressed, it should exit completely. However, when used with jewelry, especially for a person limited to the use of one hand (as devices of the disclosed technology are operable by those with only use of one hand), it may be desired for the female and male connectors to remain partially engaged after the button 350 has been pressed. In this manner, a user can push the button in one action, and pull the jewelry (or other device) off in a second action.

Figure 11:
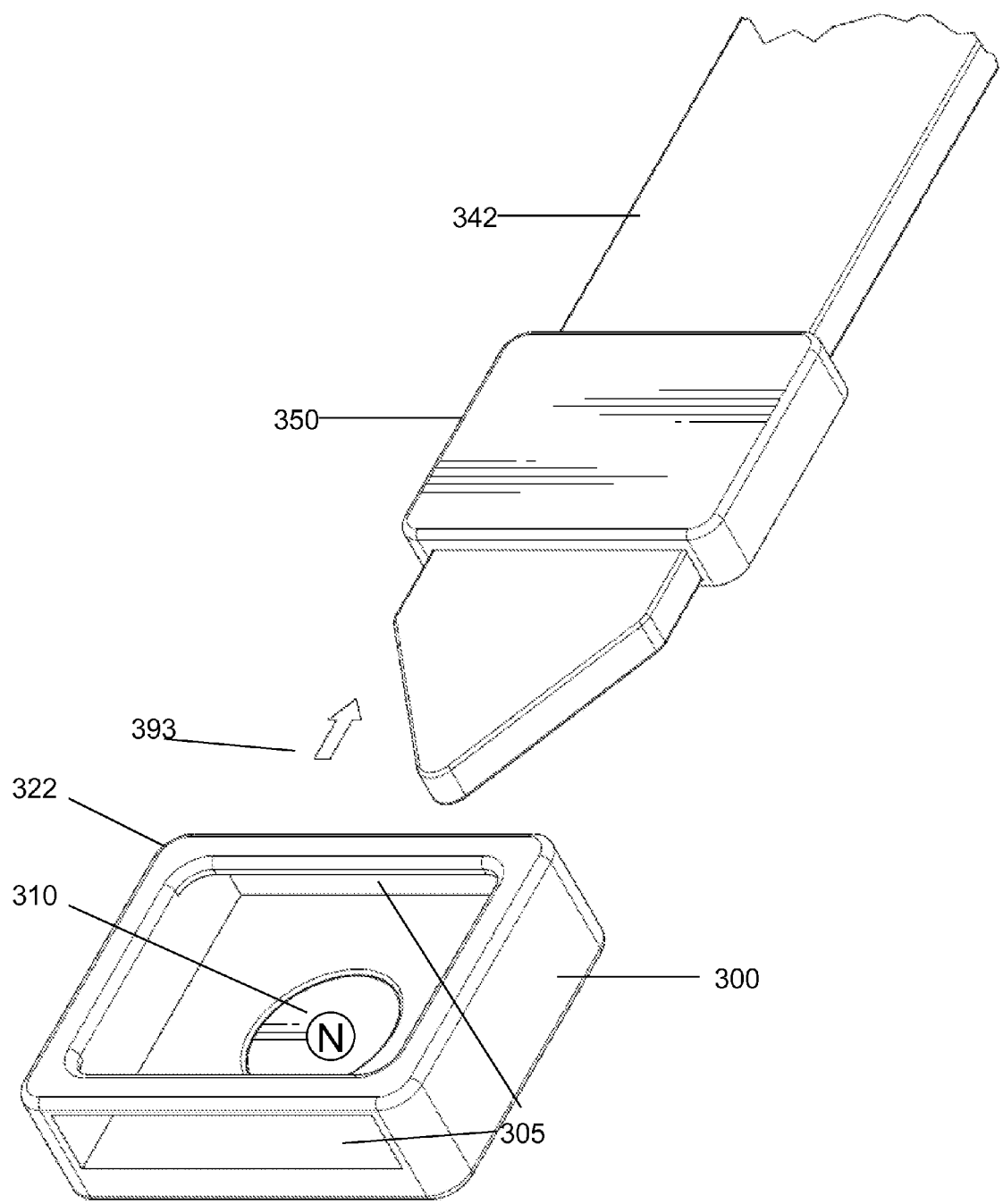
FIG. 11 shows a top perspective view of the male and female connectors in a disengaged state.

FIG. 11 shows a top perspective view of the male and female connectors in a disengaged state. Force 393 may be the same as force 395 of FIG. 10, or may be a force of a user pulling the male connector, comprising the generally elongated flat region 342 and button 350, from the female connector 350. Note that the male connector exited through a recess 305 and that two recesses 305 are visible in this figure. Note also that the magnet has been marked with an "N" indicating the direction of its north pole. It should be understood that either the north or south pole can face up (that is, away from the bottom of the base and/or towards the top receptacle situated between the top flanges 322 of the female connector and/or towards the side recess(es) 305). North faces up in this example for purposes of illustration, together with the orientation of the magnet of the male connector shown in FIG. 12.

Figure 12:
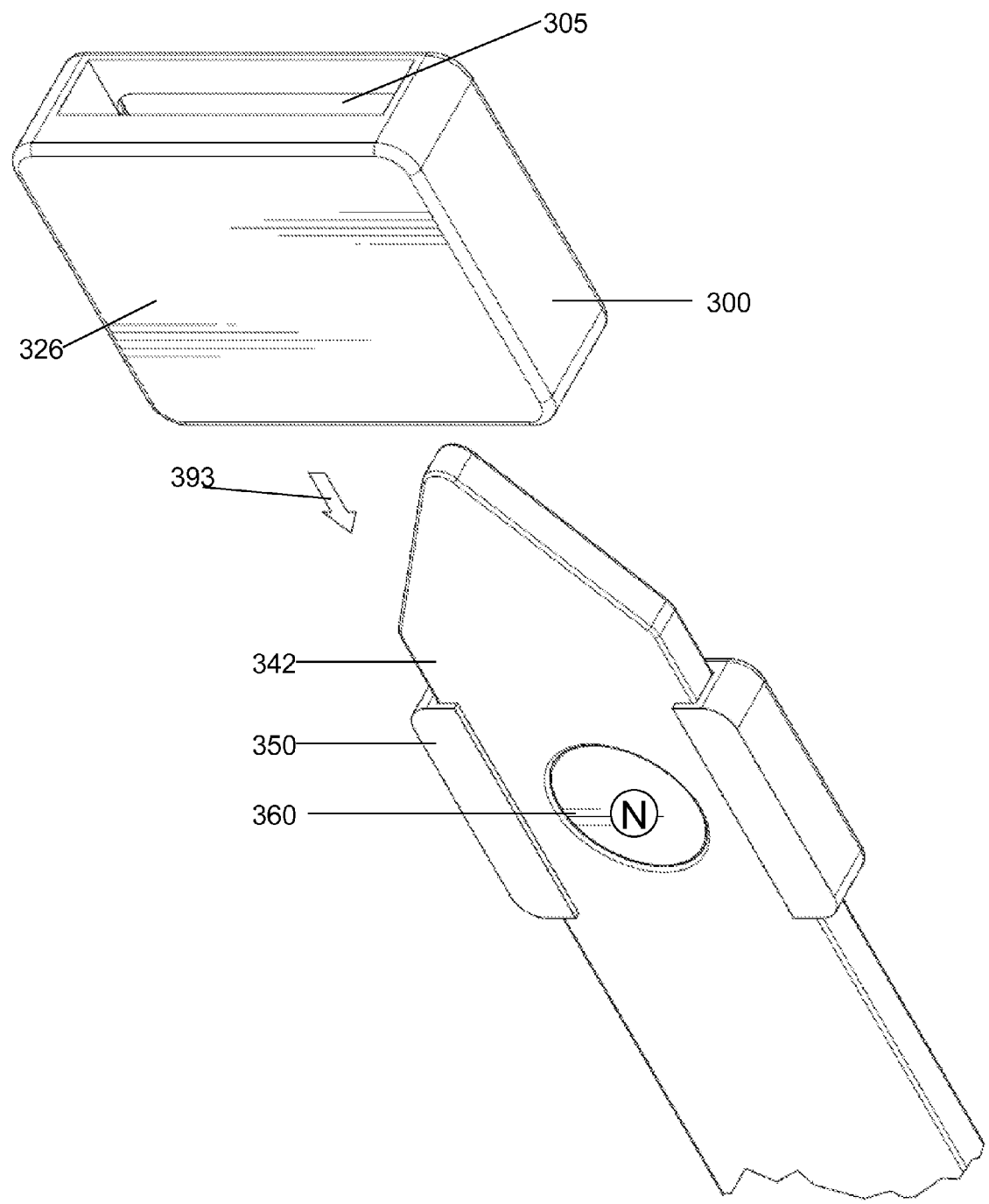
FIG. 12 shows a bottom perspective view of the male and female connectors in a disengaged state.

FIG. 12 shows a bottom perspective view of the male and female connectors in a disengaged state. FIG. 12 is analogous to FIG. 11, though shown from a different perspective. Here, the bottom side 326 of the female connector 300 is shown. The bottom side 326 holds, or is fixedly connected to, magnet 310 and is also referred to as the base of the female connector. It is the side of the female connector that holds the magnet 310 and is opposite the top side which comprises the receptacle adapted for engagement with the button 350 from the male connector 340. The side recess(es) 305 are formed from a space or portal between the base and top wall/side/receptacle of the female connector.

In the view shown in FIG. 12, the magnet 360 of the male connector is shown. For purposes of illustration, the magnet has been given a "North" orientation which is delineated by the "N" shown on the magnet 360. Thus, the north pole of the magnet faces away from the top of the button 350 and towards the base 326 of the female connector 300 when engaged therewith. In this manner, two like poles, in this case, north and north, face each other in the engaged configuration. This causes the male connector and button 350 to be pushed upwards towards the top of the female connector and for a space to be created, due to the opposing magnetic forces, between the base 326 and the male connector parts 342 and 350. As explained above, instead, the magnets may be each turned over 180 degrees, such that the south poles face each other.

Figure 13:
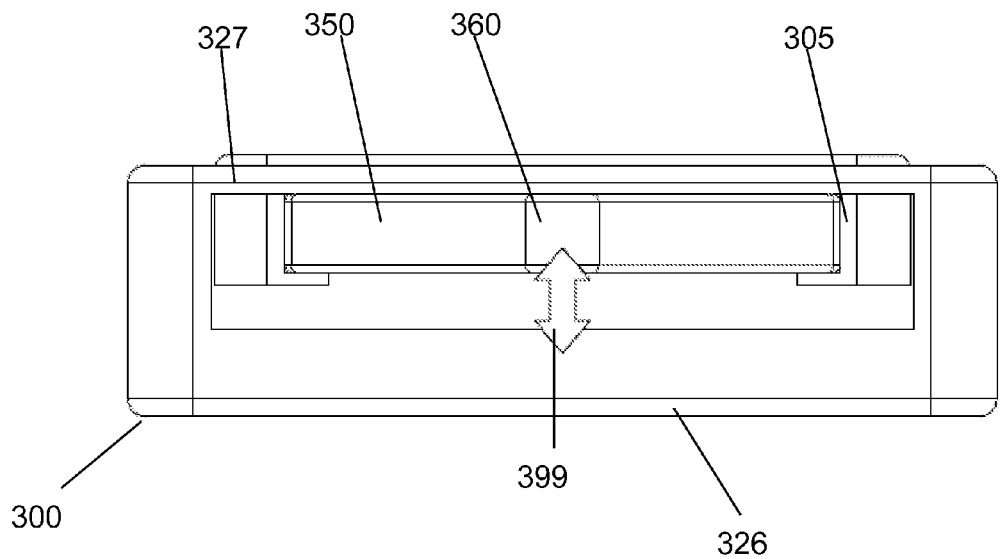
FIG. 13 shows a side elevation view of interlocked connectors in a fully engaged resting position.

FIG. 13 shows a side elevation view of interlocked connectors in a fully engaged resting position. FIG. 13 is analogous to FIG. 8, albeit from a different perspective. Base 326 is along the bottom and comprises a magnet (not visible). Forces 399, repulsive forces generated by the same poles of magnet 360 and 310 (the magnet of the base) keep the button 350 of the male connector towards the top of the female receptacle. The elongated horizontal material 342 is not shown for the sake of clarity or extends out the other side, that is, the side recess 305 opposite the one shown in the figure. By definition, at least a part of the side recess 305, or all of the side recess(es), is lower than the walls of the top receptacle 327. In this manner, the button 350 has room to "pop up." That is, the button 350 is able to move upwards into the receptacle after moving past a side recess.

Figure 14:
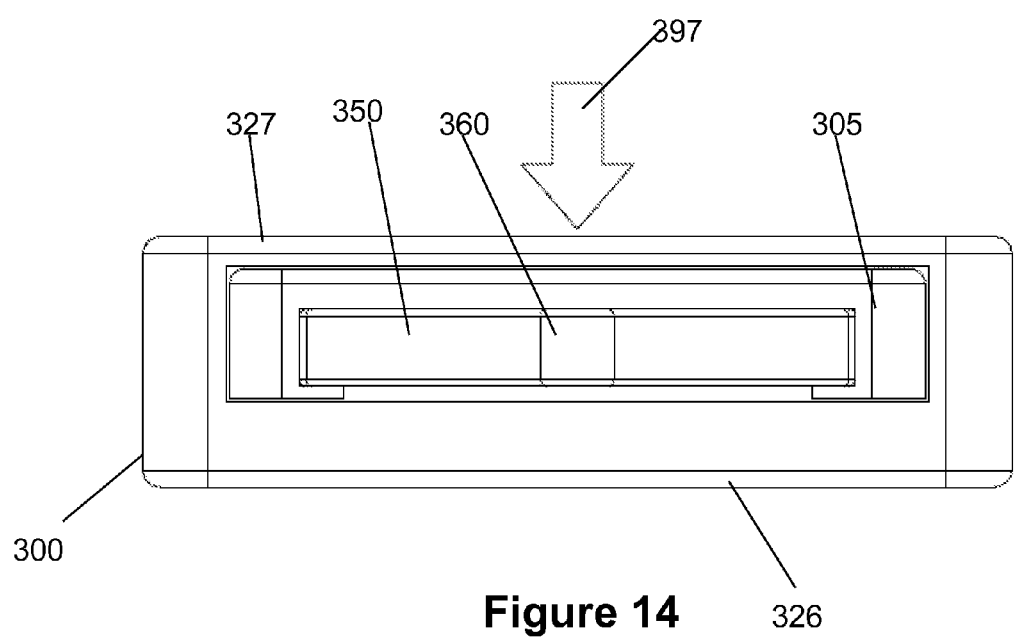
FIG. 14 shows a side elevation view of interlocked connectors just before the male connector exits from the female connector.

FIG. 14 shows a side elevation view of interlocked connectors just before the male connector exits from the female connector. FIG. 14 is analogous to FIG. 9, albeit from a different perspective. Applying force 397, a majority downward force on the button 350 causes the magnet 360, which is fixedly attached to the button 350, to be moved downwards towards the base 326 of the female connector 300. where an opposing magnet pushes upwards. The opposing magnetic forces cause the male connector, with button 350 and elongated horizontal material (not shown), to exit out of a side recess 305 formed in a side wall of the female connector 300. The side recess 305 is beneath a top recess or portal of the female connector 300, which grants a user access to the button 350, so that it may be pressed. In this manner, the male connector is disengaged from the female connector.

Figure 15:
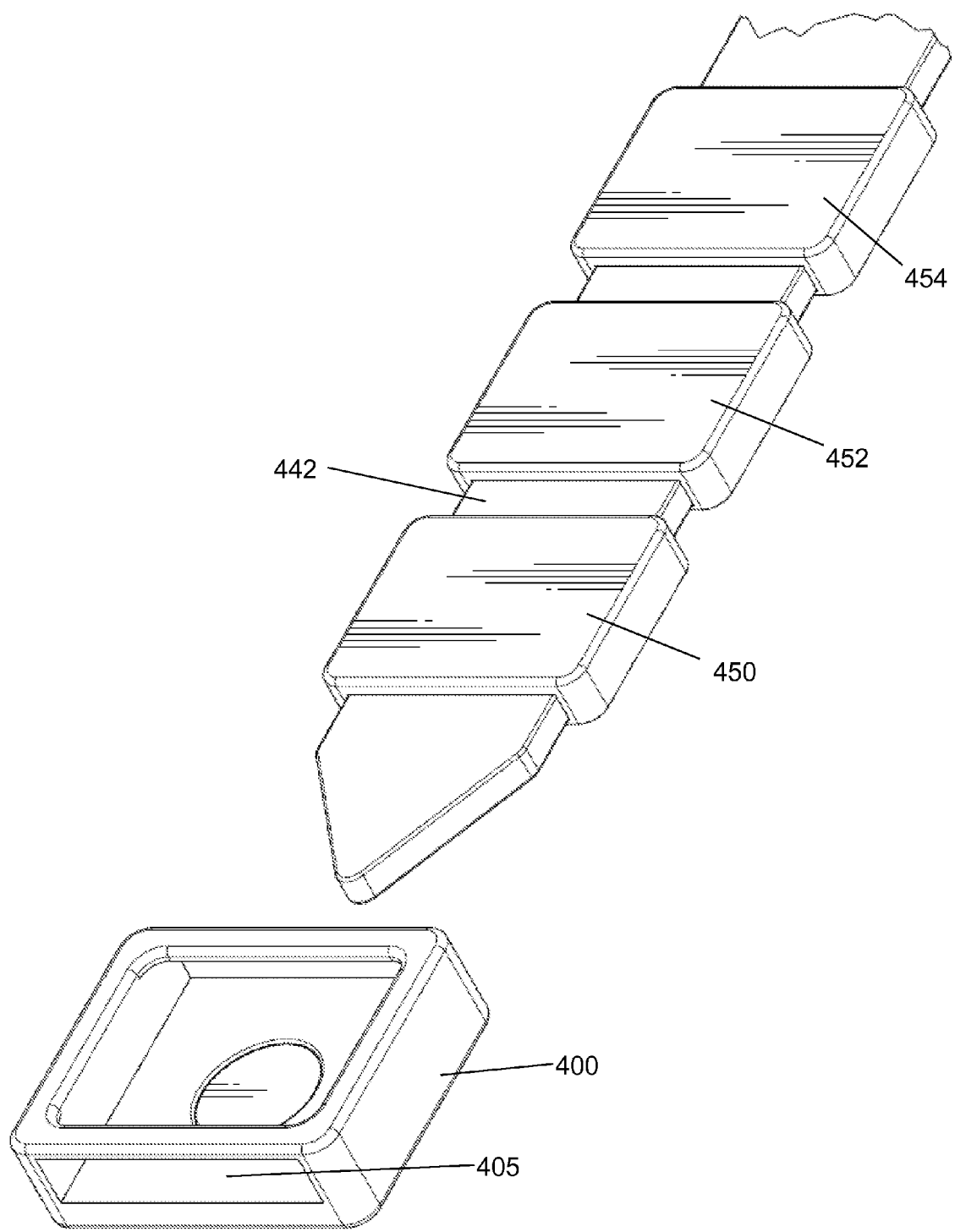
FIG. 15 shows a top perspective view of an embodiment of the disclosed technology with multiple buttons of a male connector.

FIG. 15 shows a top perspective view of an embodiment of the disclosed technology with multiple buttons of a male connector. Elements of the prior figures have been incremented by a multiple of 100, where analogous. Here, the female connector 400 is analogous to the prior disclosed female connectors. However, the male connector, while having a generally elongated horizontal and flat material 442, has a plurality of buttons 450, 452, and 454. Any number of buttons may be used, so long as each button fits within a top receptacle of the female connector 400 and is spaced apart sufficiently to allow for each other button to enter into such a top receptacle.

Figure 16:
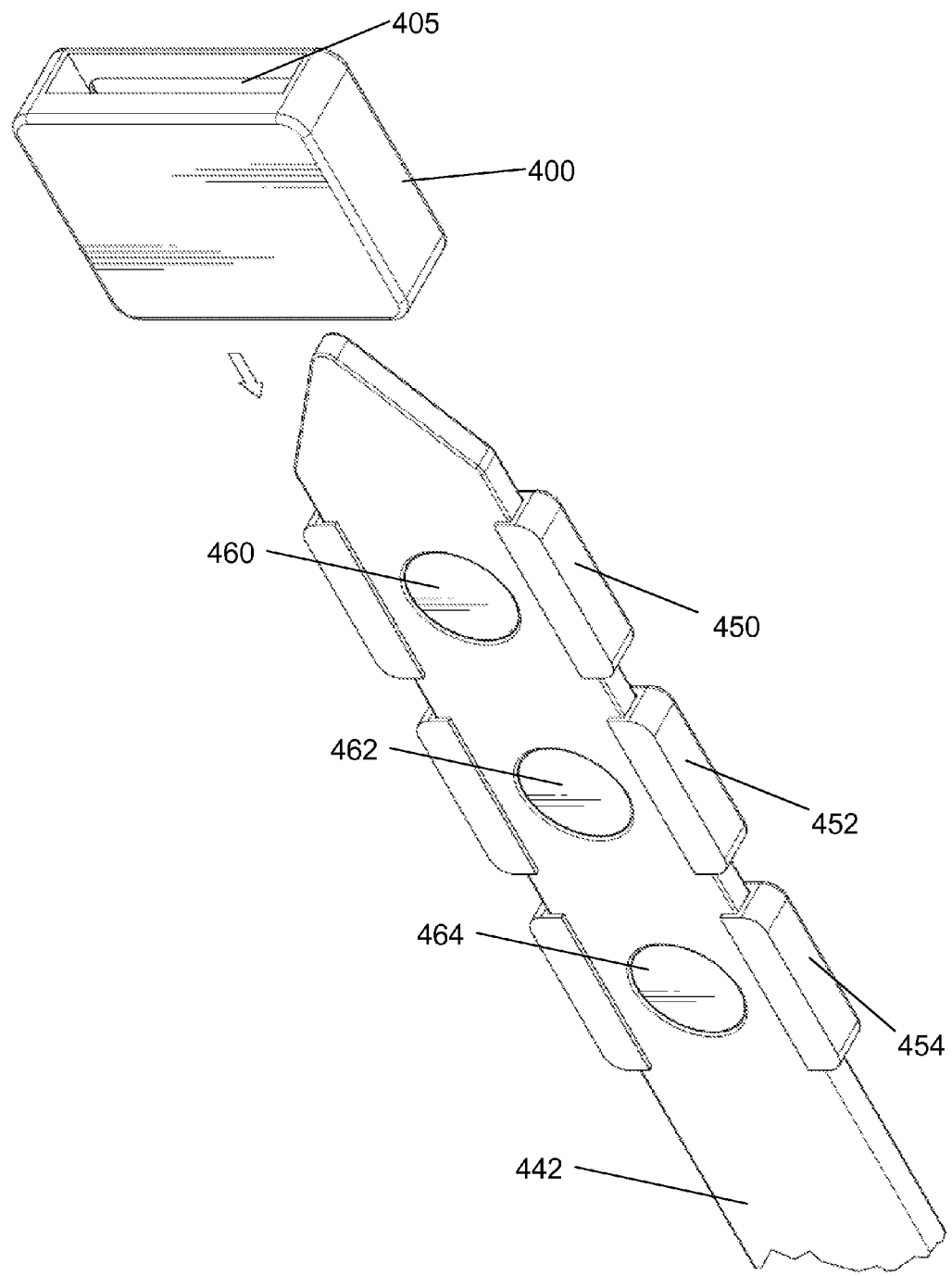
FIG. 16 shows a bottom perspective view of an embodiment of the disclosed technology with multiple buttons of a male connector.

FIG. 16 shows a bottom perspective view of an embodiment of the disclosed technology with multiple buttons of a male connector. Within the horizontal position of each button along the elongated flat horizontal material 442 is a respective magnet, 460, 462, and 464. As previously noted, the elongated flat horizontal material is defined by generally (within an acceptable tolerance level known in the art and/or within 5%) flat upper and lower surfaces, the upper surface comprising at least one button or other vertical member breaking the upper plane of the horizontal material and adapted to fit within a receptacle of a female connector and, further, both being fixedly attached to a magnet.

Referring now to FIGS. 15 and 16 simultaneously, any button 450, 452, 454, and so forth (any number of buttons may be used) fits within the top recess or receptacle of the female connector 400, after passing through a side recess 405 of the female connector. Thus, each button is adapted for passage through a recess 405 and, generally, at least two recesses. (Similarly, any number of female connectors may be used, and if two or more sets of male and female connectors are engaged, there is added strength to the connection.) In a method of use, a first button 450 becomes lodged within the female connector and held there by opposing magnetic forces in a manner similar to what has been described above with reference to prior figures. A user then depresses the button 450 and slides it, even slightly, towards a side recess 405 opposite the recess through which it entered. A second button 452 may then be lodged within the female connector, and pushed out the opposite side recess 405, until the third button, 454, becomes lodged within the female connector 400, and so forth. An application of such an embodiment may be for a belt where various lengths of a connected belt are desired. Such a device wears less than a traditional belt, in that forces pulling against the belt are spread over a greater area than that of a traditional belt with a pin which enters into a hole. Likewise, by varying the strengths and dimensions of the magnets, the strength of this or any other connection disclosed in embodiments of the disclosed technology can be modified.

Figures 17, 18:
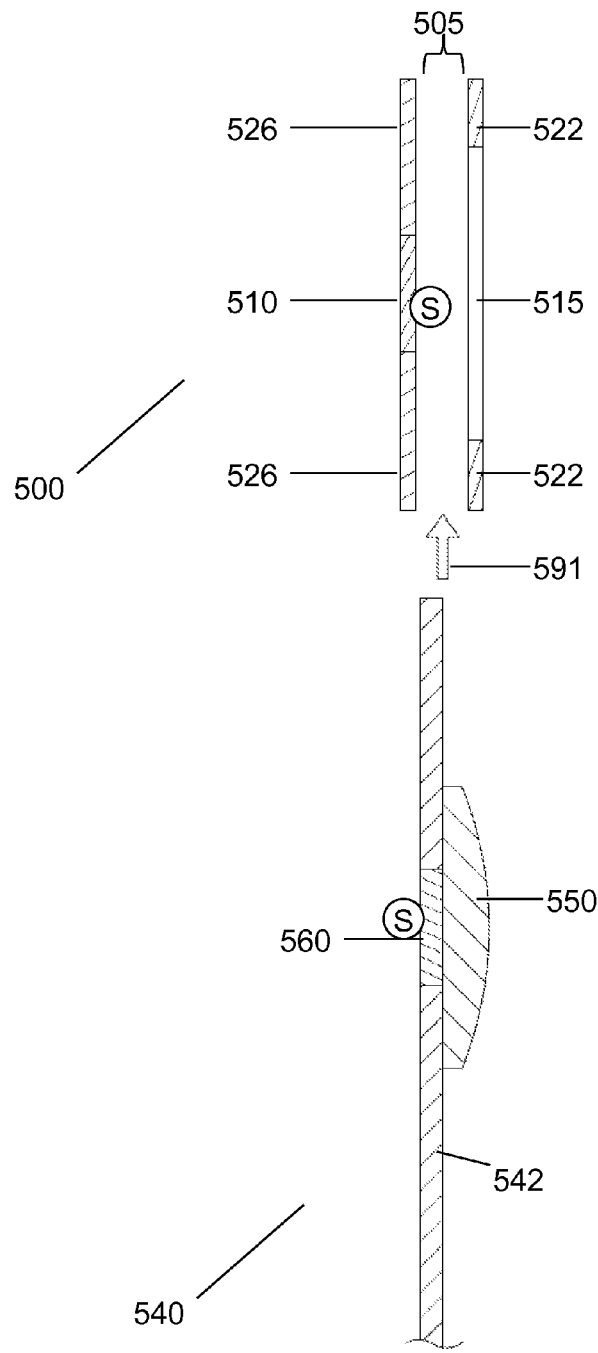
FIG. 17 shows a plan view of disconnected connectors in an embodiment of the disclosed technology.
FIG. 18 shows a plan view of engaged connectors in an embodiment of the disclosed technology.

FIG. 17 shows a side plan view of disconnected connectors in an embodiment of the disclosed technology. Elements of prior embodiments and figures have been incremented by a multiple of 100, where analogous. Here, the male connector 540 comprises a button 550 which extends above the plan of the elongated horizontal material 542 in the manner shown. Likewise, the elongated horizontal material 542 extends beyond the horizontal plane of the button 550. Expressed in another way, for purposes of this disclosure, the button 550 rises out of the vertical plane of the horizontal material 542 and the horizontal material extends horizontally further than the horizontal plane of the button 550. As such, there are connected/fixedly attached/unitary elements which are perpendicular to each other or substantially perpendicular to each other (within an acceptable tolerance level known in the art and/or comprising portions thereof which are exactly perpendicular to each other and/or within a 5 degree tolerance). Magnet 560, in this case, is shown having a south magnetic field (designated by the "S" with a circle around it) facing away from the button 550. The male connector 540 is pushed through a side receptacle 505 which extends at least part of the way (both horizontally and vertically, from the orientation of the figure) between a bottom side 526 and top side 522 of a female receptacle 500. The magnet 510 forms a unitary structure with the base 526 and may be situated such that the top plane of the magnet is flush with the top plane of the base (the top being the side facing into the space between the base and top 522), beneath the top plane, or above the top plane of the base 526. A top receptacle 515 is formed within the top of the female receptacle 522 and is accessible, at least in part, from above the female receptacle. The south poles shown may both be replaced with north poles. The magnetic forces oppose each other in embodiments of the disclosed technology.

FIG. 18 shows a side plan view of connected connectors in an embodiment of the disclosed technology. Opposing forces 599 are created by the oppositional forces between magnets 510 and 560. Button 550 extends into the top recess 515, but the button is prohibited or prevented from exiting the female connector, through the top recess 515, due to its fixed attachment to the elongated horizontal member 542 which extends past the top receptacle 515, with at least a part of the member 542 abutting the top of the female receptacle 540 at top side 522 thereof. In this manner, at least a part of the base 525/magnet 510 is spaced apart from the male connector when the male and female connectors are connected.

Figure 19:
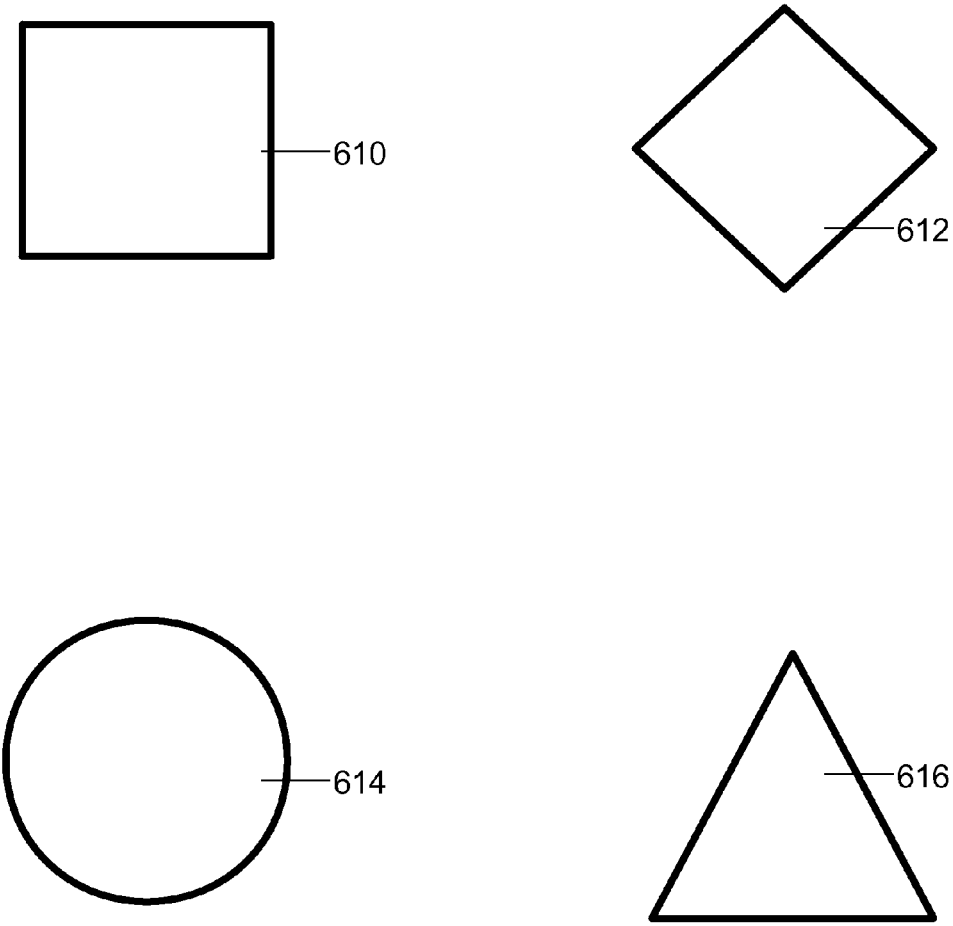
FIG. 19 shows various other shapes which may be used for the shape of a male connector or opening into a female connector.

FIG. 19 shows various other shapes which may be used for the shape of a male connector or opening into a female connector. It should be understood that any shape may be employed, including, but not limited to, a regular polygon, such as a diamond 612, triangle 616, rectangle (see FIG. 5), square 610, circle 614, or oval.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described hereinabove are also contemplated and within the scope of the invention.

I claim:

1. A connector comprising:
   a female connector, said female connector comprising a base, a top receptacle, and a side channel opening extending into a space between said base and said top receptacle;
   a male connector, adapted for passage through said side channel, comprising a top button adapted to fit into said top receptacle, and elongated material adapted to abut said top receptacle when said button is in said receptacle;
   a first magnet fixedly attached to said male connector, comprising a first polarity facing away from a top side of said male connector; and a second magnet fixedly attached to said base of said female connector, wherein a first polarity of said second magnet faces towards said first polarity of said first magnet;

wherein said top receptacle comprises a portal in a top side of said top receptacle, said top side being a side opposite said base of said female connector, said portal being in fluid flow communication with said side channel.

2. The connector of claim 1, wherein said portal in said top side, and said button, are rectangular in shape.

3. The connector of claim 1, wherein said portal in said top side as well as said button are heart-shaped.

4. A connector comprising:
a female connector, said female connector comprising a base, a top receptacle, and a side channel opening extending into a space between said base and said top receptacle;
a male connector, adapted for passage through said side channel, comprising a top button adapted to fit into said top receptacle, and elongated material adapted to abut said top receptacle when said button is in said receptacle;
a first magnet fixedly attached to said male connector, comprising a first polarity facing away from a top side of said male connector; and
a second magnet fixedly attached to said base of said female connector, wherein a first polarity of said second magnet faces towards said first polarity of said first magnet;
wherein said top receptacle of said female connector comprises a frame and a hollow receiving portion, said hollow receiving portion configured to receive part of said male connector, and wherein said side channel opening extends to said hollow receiving portion of said top receptacle.

5. The connector of claim 4, wherein said top button is adapted to fit into said hollow receiving portion of said top receptacle and said elongated material is adapted to abut against said frame of said top receptacle when said top button is in said hollow receiving portion.

6. A connector comprising:
two repelling magnets held in place relative to one another;
a passageway formed between a receptacle and a base, wherein at least part of a length of material being adapted to pass through said passageway when at least part of a vertical member extends through said receptacle;
wherein a first magnet of said two repelling magnets is fixedly attached to a base;
wherein a second magnet of said two repelling magnets is fixedly attached to a male member comprising a vertical member extending substantially perpendicularly to a length of material, at least part of said vertical member being adapted to extend through a receptacle, and said receptacle being fixedly attached to said base.

7. The connector of claim 6, wherein said vertical member extends perpendicularly to said length of material.

8. The connector of claim 7, wherein a first portion of said length of material is fixedly attached to a female connector and a second portion of said length of material comprises said vertical member.

9. The connector of claim 8, wherein said connector is on a piece of jewelry.

10. The connector of claim 6, wherein when said vertical member is depressed, said repelling magnets cause said male member to move transverse to said receptacle.

11. The connector of claim 10, wherein said vertical member is heart-shaped.

12. The connector of claim 10, wherein said vertical member is rectangular.

13. The connector of claim 6, wherein when said vertical member is depressed, said repelling magnets cause said male member to move transverse to said receptacle into said passageway.

* * * * *